United States Patent
Soeda et al.

(10) Patent No.: US 12,120,211 B2
(45) Date of Patent: Oct. 15, 2024

(54) TIME SYNCHRONIZATION OF LOCAL DEVICE

(71) Applicant: KABUSHIKI KAISHA YASKAWA DENKI, Kitakyushu (JP)

(72) Inventors: Tatsuo Soeda, Fukuoka (JP); Kazutoshi Kobayashi, Fukuoka (JP)

(*) Notice: Subject to any disclaimer, the term of this patent is extended or adjusted under 35 U.S.C. 154(b) by 375 days.

(21) Appl. No.: 17/673,802

(22) Filed: Feb. 17, 2022

(65) Prior Publication Data
US 2022/0278820 A1  Sep. 1, 2022

(30) Foreign Application Priority Data

Feb. 26, 2021 (JP) ................. 2021-030227

(51) Int. Cl.
*H04L 7/00* (2006.01)
(52) U.S. Cl.
CPC .................. *H04L 7/0016* (2013.01)
(58) Field of Classification Search
None
See application file for complete search history.

(56) References Cited

U.S. PATENT DOCUMENTS

| | | |
|---|---|---|
| 5,052,030 A | 9/1991 | Ernst et al. |
| 6,236,623 B1 | 5/2001 | Read et al. |
| 9,813,173 B2 | 11/2017 | Achanta et al. |
| 10,887,038 B2 | 1/2021 | Liu |
| 11,128,392 B2 | 9/2021 | Wen et al. |
| 11,166,250 B2 | 11/2021 | Dickie et al. |
| 2007/0124504 A1 | 5/2007 | McNealy et al. |
| 2009/0231191 A1 | 9/2009 | Wu et al. |
| 2010/0199003 A1 | 8/2010 | Kitamura et al. |
| 2011/0022734 A1 | 1/2011 | Etheridge et al. |
| 2012/0084062 A1 | 4/2012 | Maturana et al. |
| 2013/0212420 A1* | 8/2013 | Lawson ............ G06F 16/9535 713/400 |
| 2014/0233590 A1 | 8/2014 | Someya et al. |
| 2015/0103831 A1 | 4/2015 | Chandhoke et al. |
| 2015/0346760 A1 | 12/2015 | Kishiro et al. |
| 2017/0012529 A1 | 1/2017 | Yamada et al. |
| 2018/0329451 A1 | 11/2018 | Handa |

(Continued)

FOREIGN PATENT DOCUMENTS

| | | |
|---|---|---|
| EP | 2288070 | 2/2011 |
| JP | 2002-139585 | 5/2002 |

(Continued)

OTHER PUBLICATIONS

Extended Search Report in corresponding European Application No. 22156032.9, dated Jul. 19, 2022.

(Continued)

*Primary Examiner* — Hong Shao
(74) *Attorney, Agent, or Firm* — SOEI PATENT & LAW FIRM

(57) ABSTRACT

A controller includes circuitry configured to: receive global time data indicating a global time associated with an external global clock; synchronize an internal controller clock of the controller with the global clock based on the global time; set a controller time based on the synchronized controller clock; and transmit controller time data indicating the controller time to at least one local device through periodic communication.

20 Claims, 7 Drawing Sheets

(56) References Cited

U.S. PATENT DOCUMENTS

| | | |
|---|---|---|
| 2022/0085968 A1 | 3/2022 | Arakawa |
| 2022/0147022 A1 | 5/2022 | Yoneda et al. |
| 2022/0413474 A1 | 12/2022 | Nishiyama et al. |
| 2023/0305138 A1* | 9/2023 | Zhou ................ H04L 12/12 |

FOREIGN PATENT DOCUMENTS

| | | |
|---|---|---|
| JP | 2005-229322 | 8/2005 |
| JP | 2006-313458 | 11/2006 |
| JP | 2007-263753 | 10/2007 |
| JP | 2010-061458 | 3/2010 |
| JP | 4840455 | 12/2011 |
| JP | 2012-211881 | 11/2012 |
| JP | 2013-083451 | 5/2013 |
| JP | 2017-022965 | 1/2017 |
| JP | 2017-052306 | 3/2017 |
| JP | 6392180 | 9/2018 |
| JP | 2018-191226 | 11/2018 |
| JP | 2019-016872 | 1/2019 |
| JP | 2020-149402 | 9/2020 |
| WO | 2014/199729 | 12/2014 |
| WO | 2020/194714 | 10/2020 |
| WO | 2021/002421 | 1/2021 |

OTHER PUBLICATIONS

Office Action issued in Japanese Patent Application No. P2021-030227 dated Jan. 4, 2023 (with English partial translation).
Soei Patent and Law Firm, Statement of Related Matters, dated Feb. 28, 2022.
Extended Search Report in corresponding European Application No. 22155885.1, dated Jul. 4, 2022.
Office Action issued in Japanese Patent Application No. P2021-030227, dated Jun. 13, 2023 (with English partial translation).

* cited by examiner

TIME SYNCHRONIZATION OF LOCAL DEVICE

CROSS-REFERENCE TO RELATED APPLICATIONS

This application claims the benefit of priority from Japanese Patent Application No. 2021-030227, filed on Feb. 26, 2021, the entire contents of which are incorporated herein by reference.

BACKGROUND

Japanese Patent No. 4840455 discloses a field control system that synchronizes and executes computing for controlling a field device and data communication with the field device at a timing according to a timer clock based on a network time.

SUMMARY

A controller according to an aspect of the present disclosure includes circuitry configured to: receive global time data indicating a global time associated with an external global clock; synchronize an internal controller clock of the controller with the global clock based on the global time; set a controller time based on the synchronized controller clock; and transmit controller time data indicating the controller time to at least one robot through periodic communication.

A controller according to another aspect of the present disclosure includes circuitry configured to: receive global time data indicating a global time associated with an external global clock; determine a time difference between the global clock and an internal controller clock of the controller based on the global time data; compare an amount of time change corresponding to the time difference to a given threshold; divide the amount of time change over a plurality of communication cycles of periodic communication to set an amount of correction, in response to determining that the amount of time change exceeds the given threshold; correct the controller clock based on the amount of time change; synchronize the corrected controller clock with the global clock and transmit controller time data indicating a controller time based on the synchronized controller clock to at least one local device through the periodic communication.

A controller according to yet another aspect of the present disclosure includes circuitry configured to: receive global time data indicating a global time associated with an external global clock; synchronize an internal controller clock of the controller with the global clock based on the global time; set a controller time based on the synchronized controller clock; and transmit controller time data indicating the controller time to at least one local device through periodic communication.

DETAILED DESCRIPTION

In the following description, with reference to the drawings, the same reference numbers are assigned to the same components or to similar components having the same function, and overlapping description is omitted.

System Overview

Figure 1:
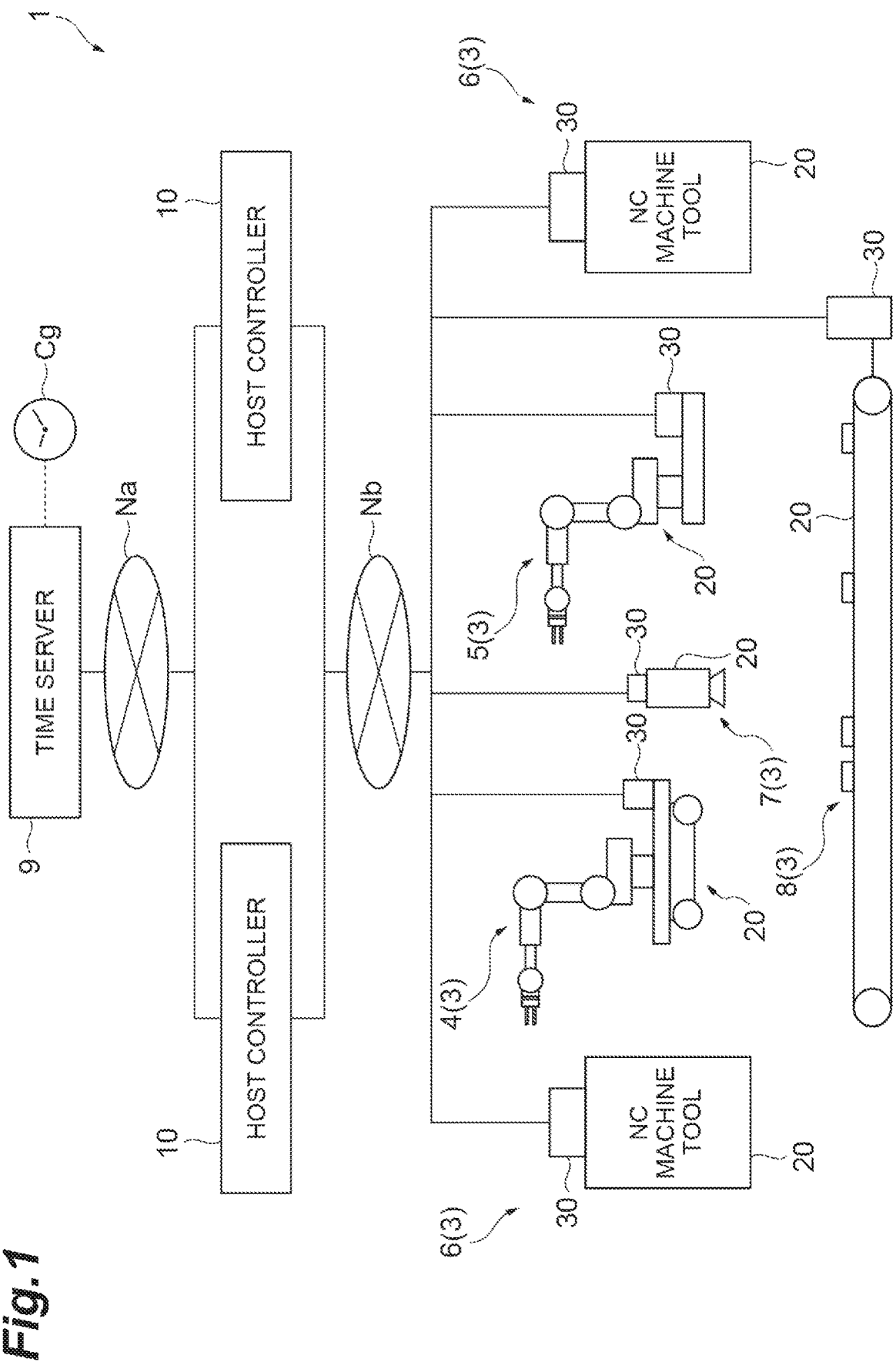
FIG. 1 is a diagram showing an overall configuration of an example device control system.

FIG. 1 is a diagram showing an overall configuration of a device control system 1 according to some examples. The device control system 1 is a mechanism for controlling a local device 3 placed in a real work environment (i.e., a field). In some examples, the device control system 1 includes at least one host controller 10 and at least one local device 3. Each host controller 10 transmits commands to at least one local device 3 to control the local device 3. One host controller 10 corresponds to at least one local device 3. A plurality of the host controller 10 may correspond to one local device 3.

The device control system 1 may include a plurality of types of local device 3. FIG. 1 shows a mobile robot 4, a mobile robot 5, an NC machine tool 6, an environmental sensor 7, and a conveyor 8 as examples of the local device 3. The mobile robot 4 is a robot that can travel autonomously. In some examples, the mobile robot 4 includes an automated guided vehicle that autonomously travels in accordance with movement commands, and a robot that performs work on a workpiece in accordance with work commands. The automated guided vehicle may be, for example, an electric AGV. The mobile robot 5 is a robot that is fixed in the work environment (e.g., to a floor). Both the mobile robot 4 and the mobile robot 5 may be a 6-axis vertical articulated robot, a 7-axis redundant robot having additional one axis joint, a so-called scalar articulated robot, or a so-called parallel link robot. In some examples, each of the mobile robot 4 and the mobile robot 5 has a tip portion, to which a tool corresponding to the purpose of processing is attached. Examples of tools include suction nozzles, robotic hands, machining tools, and welding guns. The NC machine tool 6 is a device that performs machining such as cutting on a workpiece in accordance with machining commands. The environmental sensor 7 is a device that acquires information on the work environment in accordance with sensing commands. The environmental sensor 7 may be, for example, a camera that acquires images of the work environment or a temperature sensor that acquires temperatures of the work environment. The conveyor 8 is a device that conveys a workpiece in accordance with conveyance commands. Examples of the conveyor 8 include belt conveyors and roller conveyors.

In some examples, each local device 3 includes a device body 20 that performs main functions of the local device 3 and a local controller 30 that controls the device body 20. The local controller 30 controls the device body 20 in accordance with commands from the host controller 10, and transmits responses to the commands to the host controller 10. In this example, the local controller 30 is a component of the local device 3. As other examples, the local controller 30 itself may exist as the local device 3 in the device control system 1. The local controller 30 that controls the mobile robot 4 or the mobile robot 5 is also referred to as a robot controller.

In some examples, the device control system 1 synchronizes time between each host controller 10 and each local device 3 to operate each local device 3 based on periodic communication. In a case in which the periodic communication is applied, the host controller 10 outputs a command at a given cycle, and the local device 3 operates based on the command in that cycle. The local device 3 outputs a response to the host controller 10 in that cycle, and the host controller 10 acquires the response in that cycle.

In some examples, the device control system 1 acquires a global time based on an external global clock Cg and performs the time synchronization based on the global time. By using the global time, the device control system 1 is able to manage time in the system in a unified manner, and for example, control each local device 3 based on the unique time. In some examples, the host controller 10 connects to a time server 9 with the global clock Cg via a first communication network Na and acquires a global time from the time server 9. The host controller 10 and the local device 3 are connected to each other through a second communication network Nb, and perform communications and controls based on the synchronized time based on the global time. Various methods such as Precision Time Protocol (PTP) and generalized PTP (gPTP) may be adopted to realize the time synchronization in the device control system 1. The host controller 10 may acquire the global time by a device or method other than the time server 9.

Both the first communication network Na and the second communication network Nb may be wired networks, wireless networks, or a combination thereof. Both the first communication network Na and the second communication network Nb may be constructed in a manner that at least a part thereof includes a mobile communication system. In some examples, the first communication network Na and the second communication network Nb are networks employing non-periodic communication. In this example, the device control system 1 utilizes the second communication network Nb (i.e., the non-periodic communication) to perform synchronization processing between the host controller 10 and the local device 3, and further implements periodic communication. The periodic communication refers to a communication method in which information communication is performed at regular time intervals in accordance with a predetermined format. On the other hand, the non-periodic communication refers to a communication method in which a timing of data communication is not necessarily determined.

In some examples, the device control system 1 includes a mechanism for reducing influences of fluctuation (degree of error) of the global time on the time synchronization in the device control system 1 even when the fluctuation is larger than a given reference value. In some examples, applying the controller according to one aspect of the present disclosure to the host controller 10 enables to synchronize time in the device control system 1 with the global time while absorbing the fluctuation.

In the present disclosure, the clock refers to a mechanism to continue indicating individual points in a time flow discretely or continuously along the flow. The timer indicating the lapse of time is a kind of clock. The time is a value indicating one point in the time flow. The time may be indicated with a general unit such as hour, minute, or second, or may be indicated by another method such as counter value or calendar value (system time). In the present disclosure, "time based on clock" refers to, for example, a time indicated by a clock.

Configuration of Host Controller

Figure 2:
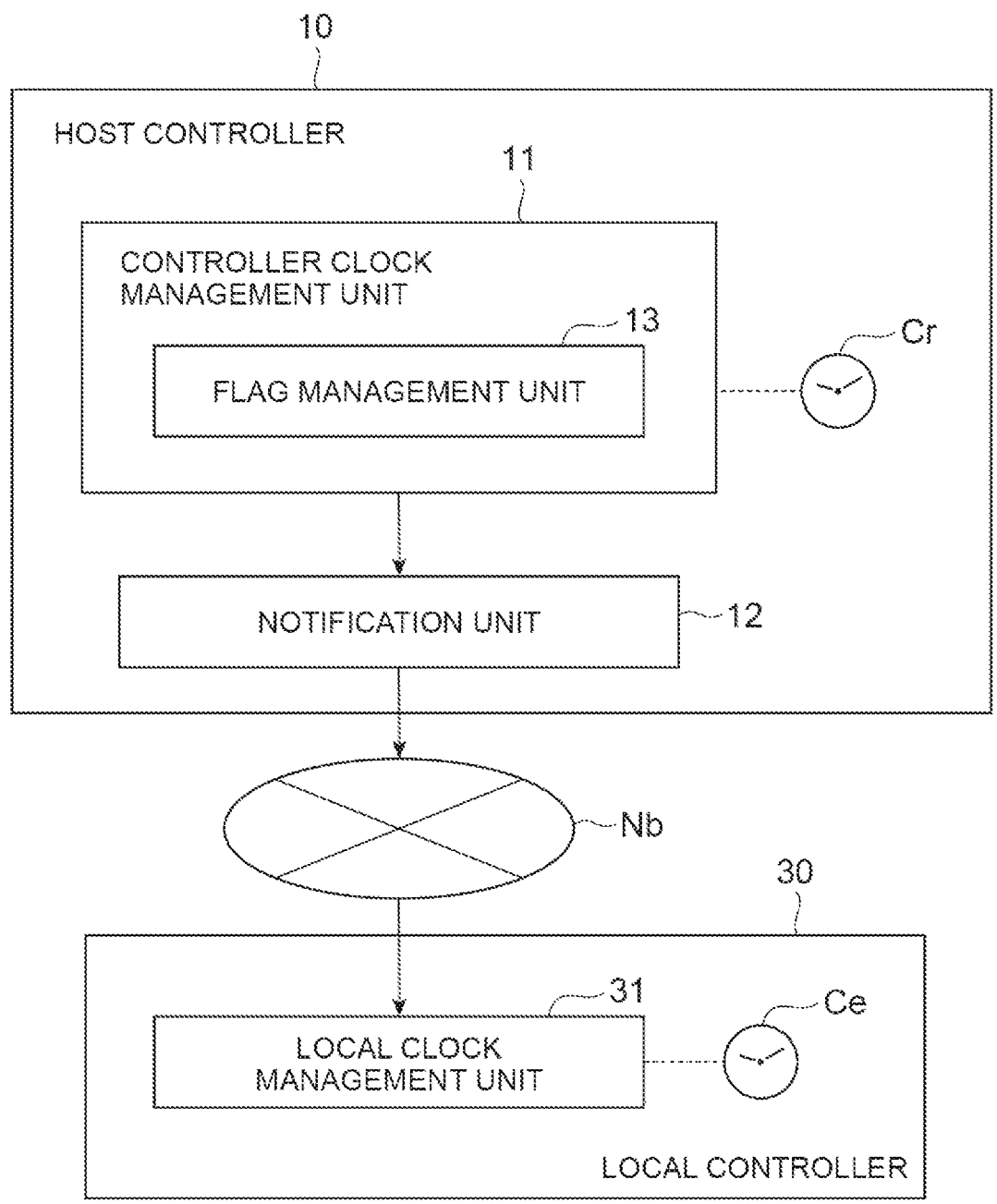
FIG. 2 is a diagram showing a functional configuration of an example device control system.

FIG. 2 is a diagram showing a functional configuration of the device control system 1. In this example, the local controller 30 is shown as at least a part of the local device 3.

In some examples, the host controller 10 has an internal clock called controller clock Cr for the time synchronization. In some examples, the host controller 10 includes a controller clock management unit 11 and a notification unit 12 as functional modules.

The controller clock management unit 11 is a functional module that synchronizes the controller clock Cr with the global clock Cg. In some examples, the controller clock management unit 11 receives the global time from the time server 9 via the first communication network (non-periodic communication), performs the time synchronization based on the global time, and sets the controller time based on the synchronized controller clock Cr. In a case in which the amount of time change corresponding to the time difference between the global clock Cg and the controller clock Cr is greater than a given threshold, the controller clock management unit 11 sets the controller time by eliminating the time difference by a stepwise process rather than a single process (i.e., by correcting the time difference gradually). In the present disclosure, such stepwise processing is referred to as adjustment of the controller time. The amount of time change refers to an amount of change of the controller time required to synchronize the controller time with the global time. In some examples, the controller clock management unit 11 corrects the controller clock Cr based on the amount of time change, as at least part of the adjustment of the controller time. The correction of the controller clock refers to a process of reducing the time difference between the controller time and the global time in a stepwise manner.

In some examples, the controller clock management unit 11 includes a flag management unit 13. The flag management unit 13 is a functional module that sets a flag utilized in the correction of the controller clock Cr. The flag indicates that the controller clock Cr is under correction. The flag management unit 13 sets the flag in response to the amount of time change exceeding a threshold, and clears the flag in response to the controller clock Cr being synchronized with the global clock Cg. In the present disclosure, the flag is also referred to as a correction flag.

The notification unit 12 is a functional module that notifies the controller time based on the synchronized controller clock Cr to at least one local device 3 by the periodic communication using the second communication network Nb. In some examples, the notification unit 12 notifies the adjusted controller time (e.g., the controller time based on the corrected controller clock Cr).

In some examples, the local controller 30 has an internal clock called local clock Ce for the time synchronization. In some examples, the local controller 30 comprises a local clock management unit 31 as a functional module. The local clock management unit 31 is a functional module that synchronizes the local clock Ce in the local controller 30 with the controller clock Cr based on the controller time notified by the notification unit 12.

Figure 3:
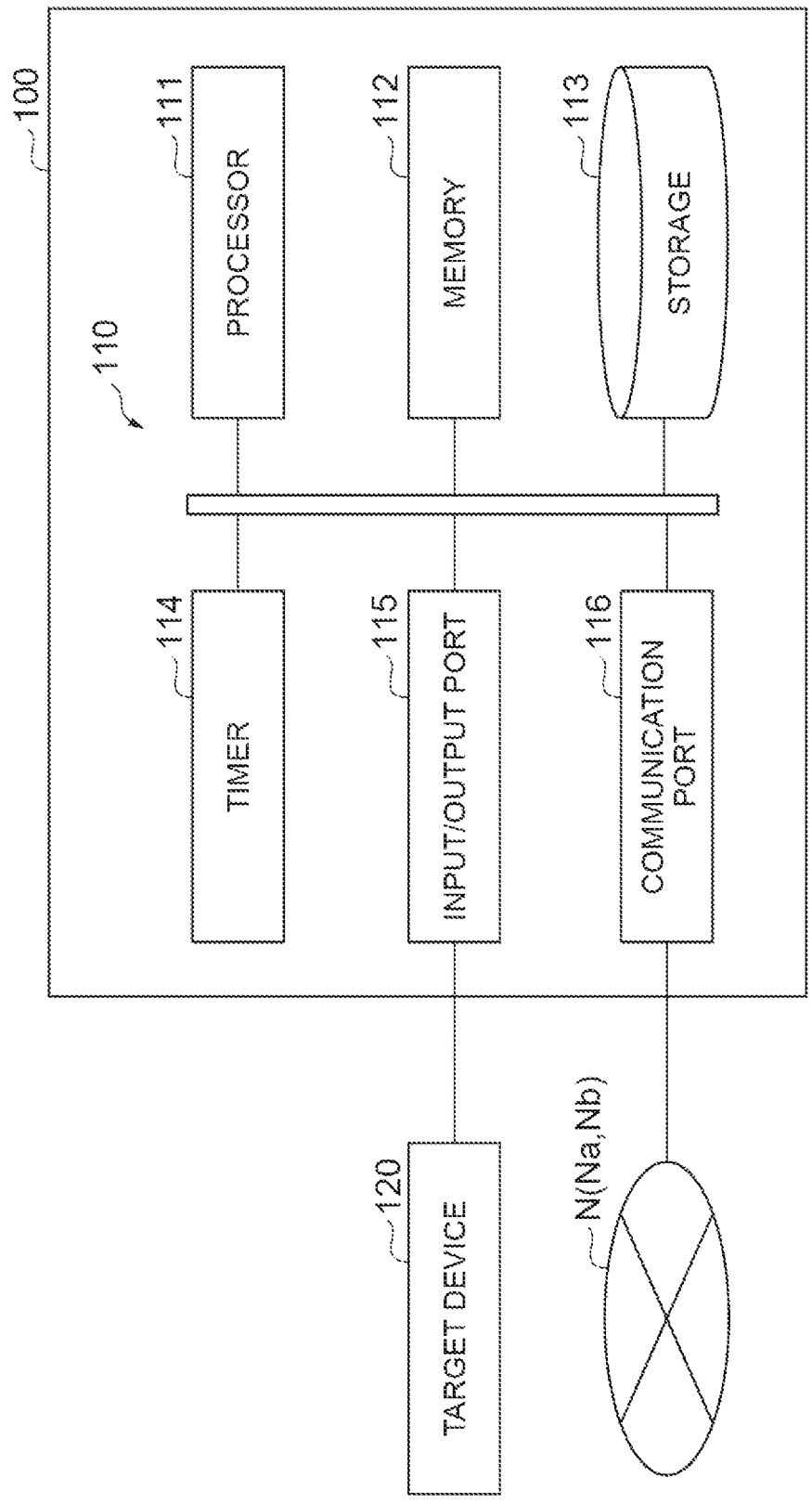
FIG. 3 is a diagram showing a hardware configuration of an example computer used in an example device control system.

FIG. 3 is a diagram showing an example of a hardware configuration of a computer 100 used in the device control system 1. For example, the host controller 10 and the local controller 30 are realized by the computer 100.

The computer 100 has circuitry 110. The circuitry 110 includes a processor 111, a memory 112, a storage 113, a timer 114, an input/output port 115, and a communication port 116. The number of each of these hardware elements may be one or two or more. The storage 113 records a program for configuring each functional module on the computer 100. The storage 113 is a computer-readable storage medium such as a hard disk, a nonvolatile semiconductor memory, a magnetic disk, or an optical disk. The memory 112 temporarily stores a program loaded from the storage 113, a calculation result of the processor 111, and so on. The processor 111 realizes each functional module by executing the program in cooperation with the memory 112. The input/output port 115 inputs and outputs electric signals to and from a target device 120 such as a device body, a monitor, or an input device in response to commands from the processor 111. The input/output port 115 may also serve to supply power to the device body. The communication port 116 performs data communication with another device via a communication network N (for example, at least one of the first communication network Na and the second communication network Nb) in accordance with commands from the processor 111.

System Operation

Figure 4:
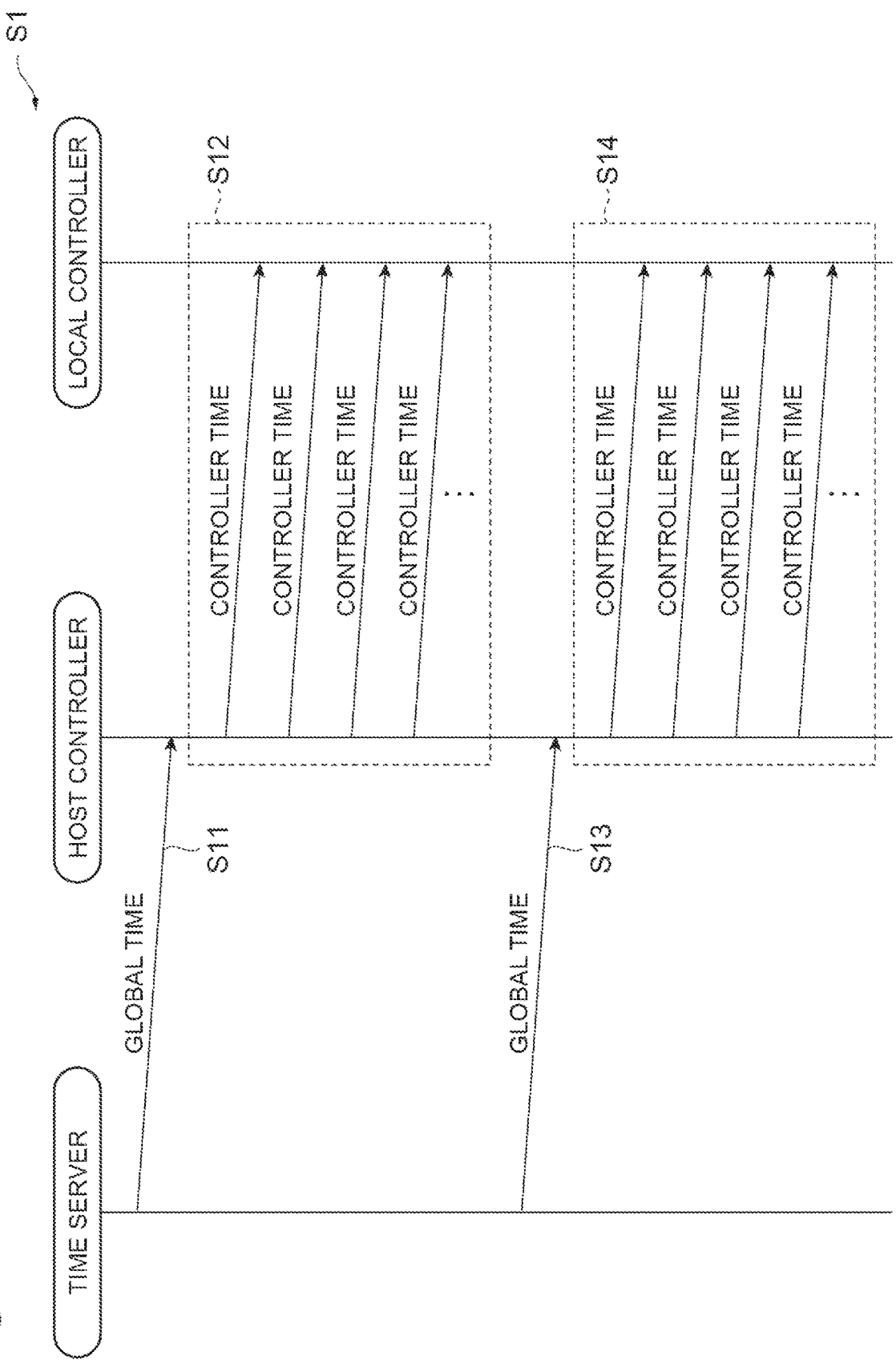
FIG. 4 is a sequence diagram showing an example process of time synchronization in a device control system.
Figure 5:
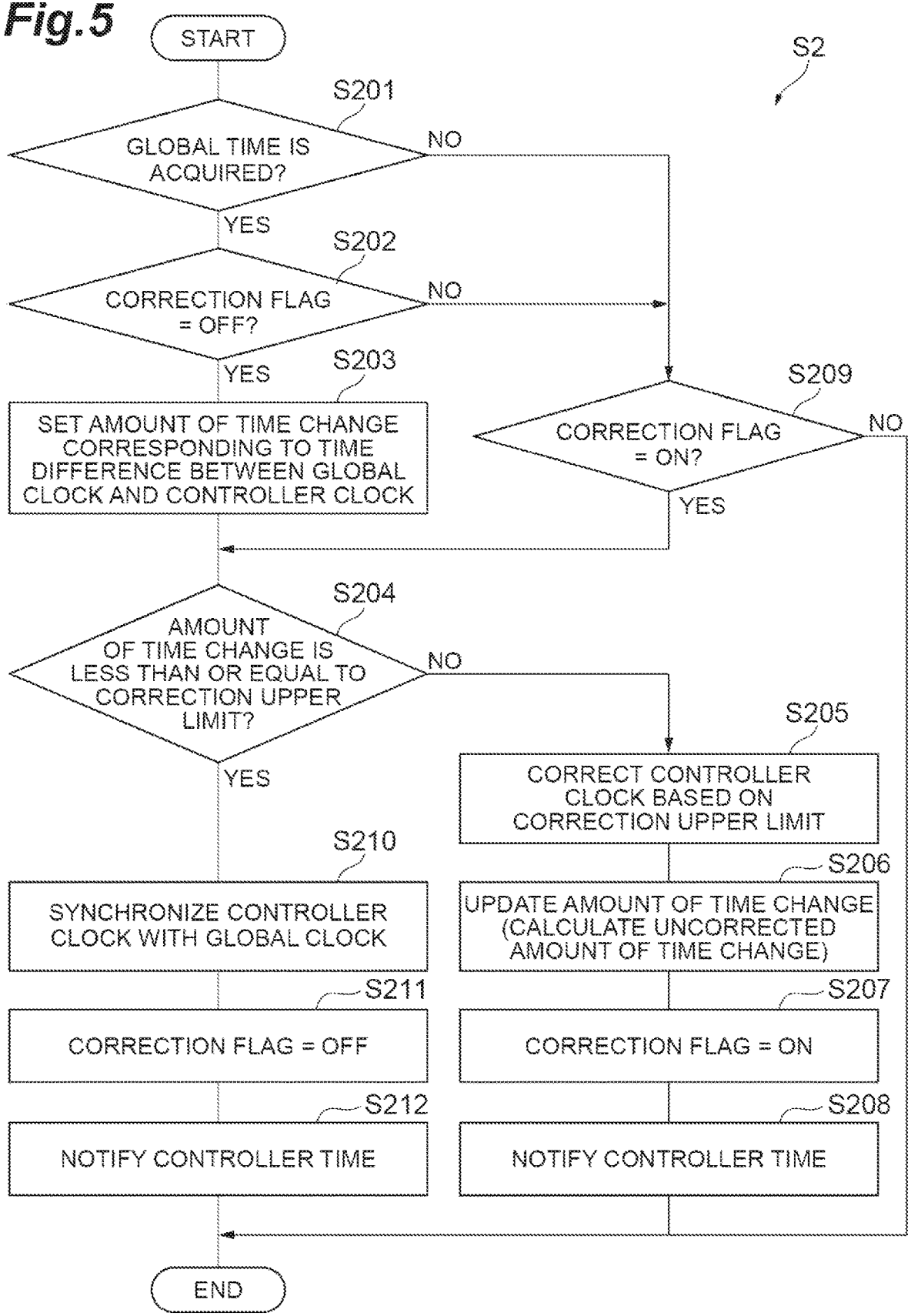
FIG. 5 is a flowchart showing an example process of correction of a controller time.

As an example of the time synchronization method according to the present disclosure, an example operation of the device control system 1 will be described with reference to FIGS. 4 and 5. FIG. 4 is a sequence diagram showing an example process of the time synchronization in the device control system 1 as a process flow 51. That is, the device control system 1 executes the process flow 51. FIG. 5 is a flowchart showing an example process of the correction of the controller time as a process flow S2. That is, the device control system 1 (the host controller 10) executes the process flow S2.

Time Synchronization

The time synchronization in the device control system 1 will be described with reference to FIG. 4. FIG. 4 shows only one host controller 10 and one local controller 30 for convenience.

In step S11, the time server 9 transmits the global time toward the host controller 10 through the first communication network (non-periodic communication) Na, and the controller clock management unit 11 receives the global time. In some examples, the time server 9 transmits global time data indicating the global time toward the host controller 10 through the first communication network Na, and the controller clock management unit 11 receives the global time data.

In step S12, the controller clock management unit 11 synchronizes the controller clock Cr with the global clock Cg based on the global time, and the notification unit 12 notifies the controller time based on the synchronized controller clock Cr to at least one local controller 30. In some examples, the notification unit 12 transmits controller time data indicating the controller time to at least one local controller 30. In the local controller 30, the local clock management unit 31 synchronizes the local clock Ce with the controller clock Cr based on a time delay (so-called transmission time delay) by the periodic communication in addition to the controller time.

In some examples, in step S12, the controller clock management unit 11 sets the controller clock Cr forward (i.e., updates the controller time) based on an internal signal having a given internal cycle. The notification unit 12 notifies or transmits the latest controller time to at least one local controller 30 in each communication cycle of the periodic communication. The communication cycle is shorter than the cycle of receiving the global time. For example, while the reception cycle of the global time is several tens of milliseconds or more, the communication cycle is from several hundreds of microseconds to several milliseconds. The communication cycle may be longer, shorter, or the same as the internal cycle. The communication cycle may be synchronized with N times or 1/N times the internal cycle (N is an integer of two or more), or may be asynchronous with the internal cycle. The local clock management unit 31 synchronizes the local clock Ce with the controller clock Cr in each communication cycle.

The processing of steps S11 and S12 is repeated every time the global time is transmitted from the time server 9 to the host controller 10. FIG. 4 shows at least part of the repetition with steps S13 and S14.

Correction of Controller Time

An example of the correction of controller time will be described with reference to FIG. 5. This example shows a series of procedures to correct the controller time in a case in which the amount of time change corresponding to the time difference between the global clock Cg and the controller clock Cr exceeds a given threshold, and to eventually synchronize the controller clock Cr with the global clock Cg. In some examples, the process flow S2 is repeated for each given communication cycle of the periodic communication. In FIG. 5, the expression "CORRECTION FLAG=OFF" means that the correction flag is cleared or is in a cleared state. The expression "CORRECTION FLAG=ON" means that the correction flag is set or in a set state.

The following description will be made on the assumption that the controller clock management unit 11 has acquired the global time and the correction flag has been initially cleared (YES in both steps S201 and S202). In this case, the process proceeds to step S203.

In step S203, the controller clock management unit 11 calculates the time difference between the global clock Cg and the controller clock Cr, and sets the amount of time change corresponding to the time difference. The controller clock management unit 11 may set the time difference as the amount of time change. Alternatively, the controller clock management unit 11 may set the amount of time change based on the time difference and at least one of the transmission delay in the first communication network Na and an internal delay of the host controller 10.

In step S204, the controller clock management unit 11 determines whether the amount of time change is less than or equal to a given correction upper limit. In some examples, the correction upper limit is an acceptable value in one communication cycle of the periodic communication and is an example of a threshold compared to the amount of time change. In response to the amount of time change exceeding the correction upper limit (NO in step S204), the process proceeds to step S205.

In step S205, the controller clock management unit 11 corrects the controller clock Cr based on the correction upper limit. The controller clock management unit 11 adds the correction upper limit to the controller time to change the controller time (if the correction upper limit is a negative value, the controller clock Cr is set back by that value).

In step S206, the controller clock management unit 11 updates the amount of time change. The controller clock management unit 11 calculates an uncorrected amount of time change by subtracting the correction upper limit from the current amount of time change. The calculated amount of time change is used in the process flow S2 in the next communication cycle.

In step S207, the flag management unit 13 sets the correction flag. This setting allows the controller clock management unit 11 to recognize that the controller clock Cr is under correction.

In step S208, the notification unit 12 notifies or transmits the corrected controller time to at least one local controller 30. In the local controller 30, the local clock management unit 31 synchronizes the local clock Ce with the controller clock Cr based on that controller time.

In the process flow S2 in the next communication cycle, a new global time is not acquired (NO in step S201), and the process proceeds to step S209. Since the correction flag is set (YES in step S209), the process proceeds to step S204.

In step S204, the controller clock management unit 11 determines whether the amount of time change updated in step S206 is equal to or less than the correction upper limit. In response to the amount of time change exceeding the correction upper limit (NO in step S204), the process proceeds to step S205, and the processes of steps S205 to S202 are executed. On the other hand, in a case in which the amount of time change is equal to or less than the correction upper limit (YES in step S204), the process proceeds to step S210.

In step S210, the controller clock management unit 11 synchronizes the controller clock Cr with the global clock Cg. This process can be said as a process of correcting the controller clock Cr based on the remaining amount of time change. As a result, the controller time matches the global time.

In step S211, the flag management unit 13 clears the correction flag. This setting allows the controller clock management unit 11 to recognize that the controller clock Cr is not in a state of correction.

In step S212, the notification unit 12 notifies or transmits the corrected controller time to at least one local controller 30. Based on this notification or transmission, the local clock management unit 31 synchronizes the local clock Ce with the controller clock Cr.

As shown by the process flow S2, in response to the amount of time change exceeding the given threshold, the controller clock management unit 11 does not eliminate the amount of time change in a single process to synchronize the controller clock Cr with global clock Cg, but corrects the controller clock Cr by the amount of correction obtained by dividing the amount of time change over a plurality of communication cycles. The amount of correction is, for example, the correction upper limit used in step S205 or the amount of time change remaining in step S210. That is, the controller clock management unit 11 sets the amount of correction within a given correction upper limit in each of the plurality of communication cycles. The controller clock management unit 11 repeats the correction of the controller clock Cr until the amount of correction becomes equal to or less than the correction upper limit, and synchronizes the controller clock Cr with the global clock Cg in response to the amount of correction becoming equal to or less than the correction upper limit.

When the correction flag is set (when the correction flag is ON), the controller clock management unit 11 corrects the controller clock Cr based on the amount of time change without using the global time (that is, without referring to the global clock Cg).

In the process flow S2, the controller clock management unit 11 may synchronize the controller clock Cr with the global clock Cg further based on the internal delay in the host controller 10.

Modifications of Host Controller

Figure 6:
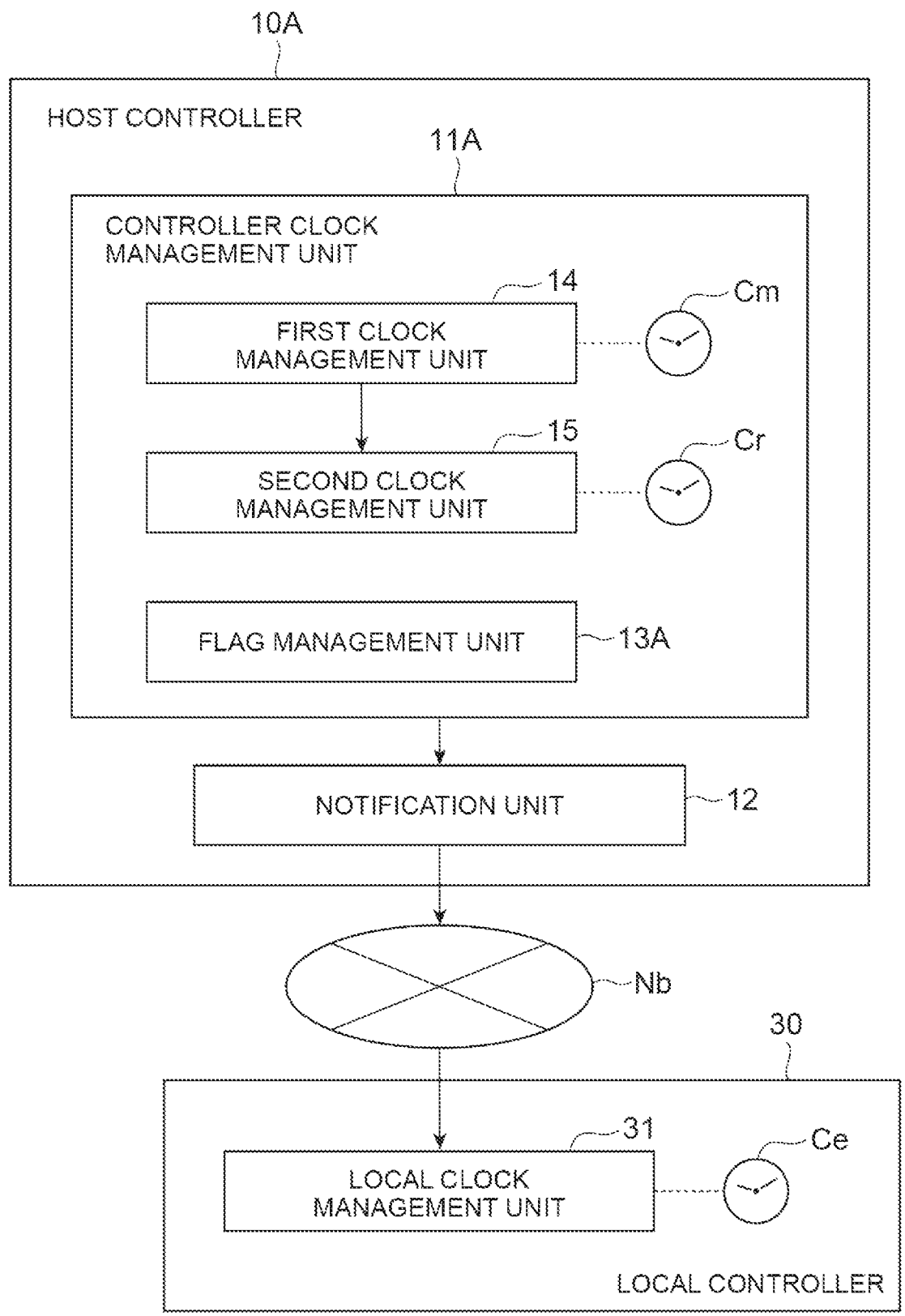
FIG. 6 is a diagram showing a functional configuration of another example device control system.

The controller may include at least one other internal clock in addition to the controller clock, and synchronize the controller clock with the global clock using the at least two internal clocks. FIG. 6 shows a host controller 10A as a modification. The host controller 10A has a master clock Cm in addition to the controller clock Cr. The host controller 10A includes a controller clock management unit 11A and the notification unit 12 as functional modules.

The controller clock management unit 11A include a first clock management unit 14, a second clock management unit 15, and a flag management unit 13A. The first clock management unit 14 is a functional module that synchronizes the master clock Cm with the global clock Cg and sets the master time based on the master clock Cm. The second clock management unit 15 is a functional module that synchronizes the controller clock Cr with the master clock Cm and sets the controller time based on the controller clock Cr. The flag management unit 13A is a functional module that sets a flag utilized in corrections of at least one of the master clock Cm and the controller clock Cr, and has the same function as the flag management unit 13.

Figure 7:
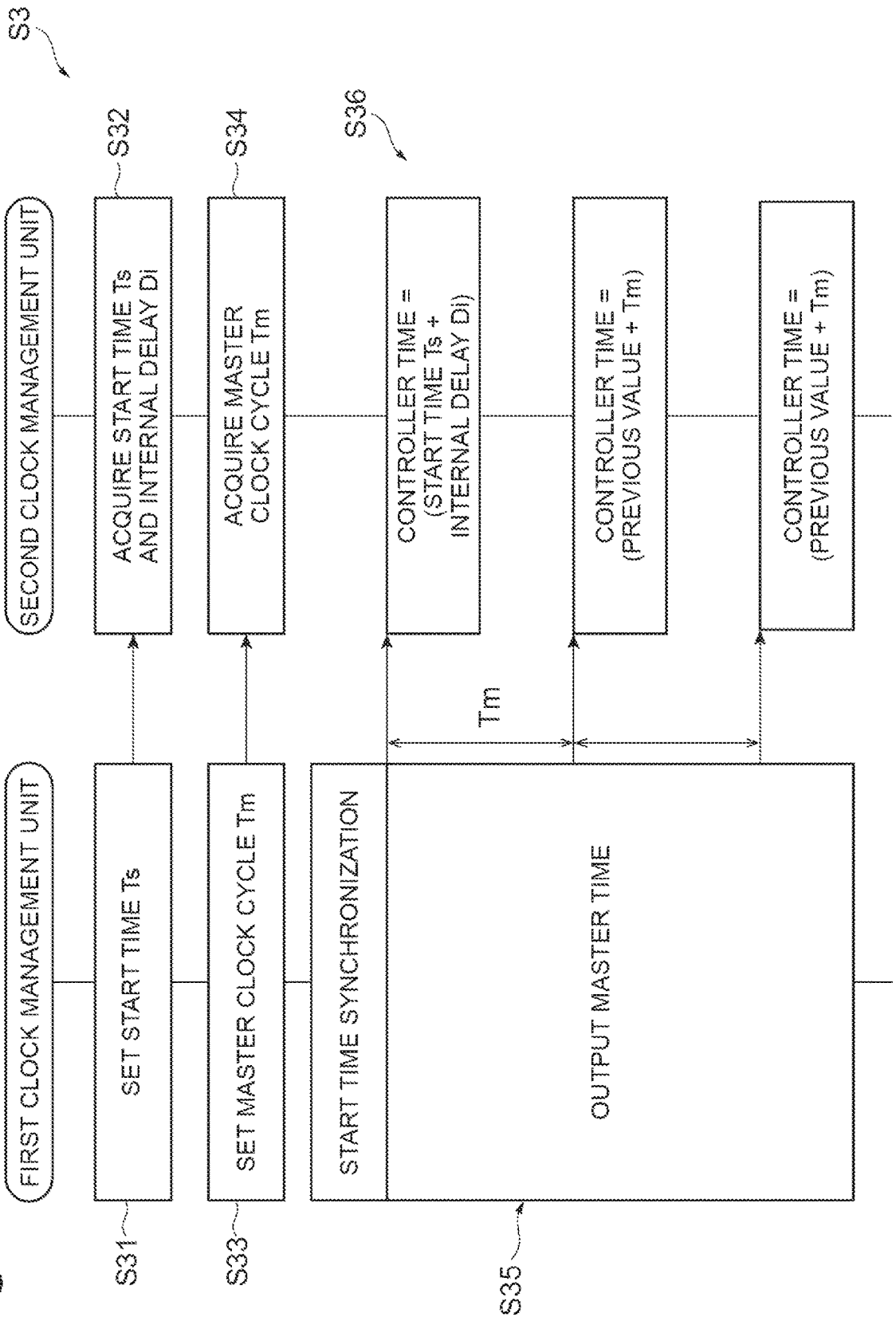
FIG. 7 is a sequence diagram showing an example process of time synchronization in a host controller.

FIG. 7 is a sequence diagram showing an example process of the time synchronization in the host controller 10A as a process flow S3. That is, the host controller 10A executes the process flow S3.

In step S31, the first clock management unit 14 sets a start time Ts of the master clock Cm based on the global time, and outputs the start time Ts to the second clock management unit 15. In step S32, the second clock management unit 15 acquires the start time Ts and further acquires an internal delay Di related to the second clock management unit 15.

In step S33, the first clock management unit 14 sets a master clock cycle Tin of the master clock signal and outputs the master clock cycle Tin to the second clock management unit 15. In step S34, the second clock management unit 15 acquires the master clock cycle Tin. The second clock management unit 15 may set the internal cycle of the internal signal corresponding to the controller time based on the master clock cycle Tin. In some examples, the second clock management unit 15 sets an internal cycle shorter than the master clock cycle Tin, for example, an internal cycle that is 1/N times the master clock cycle Tin (N is an integer of 2 or more).

Then, the first clock management unit 14 and the second clock management unit 15 cooperate to perform the time synchronization on the master clock Cm and the controller clock Cr. In the following, the processes in the first clock management unit 14 and the second clock management unit 15 will be described as step S35 and S36, respectively.

In step S35, the first clock management unit 14 starts the time synchronization and notifies or outputs the master clock signal having the master clock cycle Tin to the second clock management unit 15.

In step S36, the second clock management unit 15 synchronizes the controller clock Cr with the master clock Cm based on the master clock signal. In this synchronization, the second clock management unit 15 sets the sum of the start time Ts and the internal delay Di as an initial value of the controller time. After that, the second clock management unit 15 updates the controller time by adding the master clock cycle Tin to a previous value of the controller time, in each master clock cycle Tin. In addition to that update, the second clock management unit 15 may update the controller time based on the internal cycle.

In some examples, the controller clock management unit 11A executes the process flow S2 in at least one of steps S35 and S36. Therefore, even in a case where the amount of time change becomes relatively large in the mechanism in which the master clock Cm is introduced to synchronize the controller clock Cr with the global clock Cg in two stages, the influence on the control of the local device 3 can be minimized. The same can be said in a case in which the controller has three or more internal clocks.

Program

Each functional module of the host controller 10 and 10A is realized by reading a time synchronization program on the processor 111 or the memory 112 and causing the processor 111 to execute the program. The time synchronization program includes codes for realizing each functional module of the host controller 10 or 10A. The processor 111 operates the input/output port 115 or the communication port 116 according to the time synchronization program, and reads and writes data in the memory 112 or the storage 113. Such processing realizes each functional module of the device control system 1.

The time synchronization program may be provided after being fixedly stored on a non-transitory storage medium such as a CD-ROM, a DVD-ROM, or a semiconductor memory. Alternatively, the time synchronization program may be provided as data signals superimposed on carrier waves via a communication network.

As described above, a controller according to an aspect of the present disclosure includes circuitry configured to: receive global time data indicating a global time associated with an external global clock; synchronize an internal controller clock of the controller with the global clock based on the global time; set a controller time based on the synchronized controller clock; and transmit controller time data indicating the controller time to at least one robot through periodic communication.

A processor-executable method according to an aspect of the present disclosure includes: receiving global time data indicating a global time associated with an external global clock; synchronizing an internal controller clock of the controller with the global clock based on the global time; setting a controller time based on the synchronized controller clock; and transmitting controller time data indicating the controller time to at least one robot through periodic communication.

A non-transitory computer-readable storage medium according to an aspect of the present disclosure stores processor-executable instructions to: receive global time data indicating a global time associated with an external global clock; synchronize an internal controller clock of the controller with the global clock based on the global time; set a controller time based on the synchronized controller clock; and transmit controller time data indicating the controller time to at least one robot through periodic communication.

According to such examples, since the controller time based on the controller clock synchronized with the global clock is transmitted to the robot, the time in a system can be uniformly managed. For example, at least one robot may be controlled based on a unique time.

In some examples, the circuitry may be further configured to: determine a time difference between the global clock and the controller clock; and adjust the controller time based on an amount of time change corresponding to the time difference between the global clock and the controller clock. Since the time difference is eliminated by adjusting the controller time in accordance with the amount of time change, the influence on the control of the robot due to the time difference can be suppressed.

In some examples, the circuitry may be further configured to: correct the controller clock based on the amount of time change, as at least a part of adjusting the controller time; and set the controller time based, at least in part, on the corrected controller clock. Since the time of the controller clock is adjusted while synchronizing the clocks between the controller and the robot, the influence on the control of the robot by the controller can be suppressed.

In some examples, the circuitry may be configured to: compare the amount of time change to a given threshold; divide the amount of time change over a plurality of communication cycles of the periodic communication to set an amount of correction, in response to determining that the amount of time change exceeds the given threshold; correct the controller clock based on the amount of correction; and synchronize the corrected controller clock with the global clock. Since a relatively large amount of time change is gradually eliminated over multiple communication cycles, the time can be adjusted while avoiding large changes in the controller time which affect the control of the robot. As a result, the accuracy of the time synchronization can be maintained at a certain level or higher.

In some examples, the circuitry may be further configured to set the amount of correction within a given correction upper limit, in each of the plurality of communication cycles. Since fluctuations of the amount of correction can be suppressed by setting an upper limit of the correction, the correction can be smoothly performed while leveling off the degree of change in the controller time.

In some examples, the circuitry may be further configured to set the correction upper limit based on one communication cycle of the periodic communication.

In some examples, the circuitry may be further configured to: repeat the correction of the controller clock until the amount of correction becomes less than or equal to the correction upper limit; and synchronize the controller clock to the global clock in response to determining that the amount of correction becomes less than or equal to the correction upper limit. By repeating the correction and then finally synchronizing the controller clock with the global clock, time can be adjusted while avoiding large changes in the controller time.

In some examples, the circuitry may be further configured to: set a flag indicating that the controller clock is under correction, in response to determining that the amount of time change exceeds the threshold; and correct the controller clock based on the amount of time change without referring to the global clock, in response to setting the flag. By not utilizing the global clock when correcting the time difference, the time can be adjusted while avoiding large changes in the controller time.

In some examples, the circuitry may be further configured to clear the flag in response to determining that the controller clock is synchronized with the global clock. By setting the flag in such a manner, the global clock is newly referred to after a series of processes of correction and synchronization of the controller clock is completed. Thus, the time synchronization can be stabilized.

In some examples, the controller time data may be transmitted to the at least one robot, in each communication cycle of the periodic communication. By transmitting the controller time in each communication cycle, the synchronized controller time can be transmitted to the robot at an appropriate timing.

In some examples, the circuitry may be further configured to receive the global time data from a time server through a non-periodic communication. In this case, the time in the system can be uniformly managed using the global time obtained through the non-periodic communication.

In some examples, the circuitry may be further configured to: synchronize a master clock of the controller with the global clock to set a master time based on the master clock; and synchronize the controller clock with the master clock to set the controller time. By introducing the master clock to synchronize the clocks in two stages, the influence of fluctuations related to time synchronization can be suppressed and a robust time synchronization can be realized.

In some examples, the circuitry may be further configured to: generate a master clock signal corresponding to the master time and having a master clock cycle; generate an internal signal corresponding to the controller time and having a given internal cycle, based on the master clock cycle; set a start time based on the master clock; and synchronize the controller clock with the master clock based on the start time and at least one of the master clock cycle and the internal cycle. By generating the internal signal based on the cycle of the master clock signal and performing the synchronization using at least one of the cycles of both signals, an accurate time synchronization can be realized.

In some examples, the circuitry may be further configured to: set the internal cycle shorter than the master clock cycle; and generate the internal signal having the set internal cycle. By using the internal signal, the time in the controller can be synchronized with the master time at the shorter interval, and thus the influence of fluctuations of the clock signal can be more reliably suppressed and a robust time synchronization can be realized.

In some examples, the controller clock may be synchronized with the global clock further based on an internal delay in the controller. Since the internal delay in the controller is considered, the controller clock can be more accurately synchronized with the global clock.

In some examples, a device control system including the above controller, may further comprises the at least one robot. Each of the at least one robot may be configured to synchronize a local clock of the robot with the controller clock based on the transmitted controller time data.

In such examples, the controller time based on the controller clock synchronized with the global clock is transmitted to the robot, and the robot synchronizes the local clock with the controller clock based on the controller time. Therefore, the time in a system can be managed uniformly. For example, at least one robot can be controlled based on a unique time.

In some examples, the local clock may be synchronized with the controller clock further based on a time delay of the periodic communication. By taking the time delay into consideration, synchronization of the local clock can be performed more accurately.

A controller according to another aspect of the present disclosure includes circuitry configured to: receive global time data indicating a global time associated with an external global clock; determine a time difference between the global clock and an internal controller clock of the controller based on the global time data; compare an amount of time change corresponding to the time difference to a given threshold; divide the amount of time change over a plurality of communication cycles of periodic communication to set an amount of correction, in response to determining that the amount of time change exceeds the given threshold; correct the controller clock based on the amount of time change; synchronize the corrected controller clock with the global clock and transmit controller time data indicating a controller time based on the synchronized controller clock to at least one local device through the periodic communication.

A controller according to another aspect of the present disclosure includes circuitry configured to: receive global time data indicating a global time associated with an external global clock; synchronize an internal controller clock of the controller with the global clock based on the global time; set a controller time based on the synchronized controller clock; and transmit controller time data indicating the controller time to at least one local device through periodic communication.

A processor-executable method according to another aspect of the present disclosure includes: receiving global time data indicating a global time associated with an external global clock; synchronizing an internal controller clock of the controller with the global clock based on the global time; setting a controller time based on the synchronized controller clock; and transmitting controller time data indicating the controller time to at least one local device through periodic communication.

A non-transitory computer-readable storage medium according to another aspect of the present disclosure stores processor-executable instructions to: receive global time data indicating a global time associated with an external global clock; synchronize an internal controller clock of the controller with the global clock based on the global time; set a controller time based on the synchronized controller clock; and transmit controller time data indicating the controller time to at least one local device through periodic communication.

According to such examples, since the controller time based on the controller clock synchronized with the global clock is transmitted to the local device, the time in a system can be uniformly managed. For example, at least one local device may be controlled based on a unique time.

ADDITIONAL EXAMPLES

It is to be understood that not all aspects, advantages and features described herein may necessarily be achieved by, or included in, any one particular example. Indeed, having described and illustrated various examples herein, it should be apparent that other examples may be modified in arrangement and detail is omitted.

In the above examples, the host controller 10 gradually reduces the time difference between the controller clock Cr and the global clock Cg. In some examples, the controller may eliminate the time difference in a single process and perform a correction on a time to be notified or transmitted to at least one local device. That time may temporarily deviate from a time indicated by the controller clock Cr. That is, the controller may synchronize the controller clock with the global clock regardless of an amount of time difference, and reduce the time difference with respect to the time to be notified or transmitted to each local device, in a stepwise manner.

The hardware configuration of the system is not limited to examples in which each functional module is realized by executing a program. In some examples, at least a part of the functional modules described above may be configured by logic circuitry dedicated to carry out the function, or may be configured by an application specific integrated circuit (ASIC) in which the logic circuitry is integrated.

A procedure of the method executed by at least one processor is not limited to the above examples. For example, some of the above-described steps or processing may be omitted, or executed in a different order. Further, two or more of the above-described steps may be combined, or a part of the steps may be modified or deleted. Alternatively, other steps may be performed in addition to the above steps.

In a case where the magnitude relation between two numerical values is compared in a computer system or a computer, either of the two criteria "greater than or equal to" and "greater than" may be used, and either of the two criteria "less than or equal to" and "less than" may be used.

We claim all modifications and variations coining within the spirit and scope of the subject matter claimed herein.

Regarding the above examples, the following appendices are provided by way of further illustration.

(Appendix 1) A controller comprising:
a controller clock management unit configured to synchronize a controller clock in a controller with an external global clock; and
a notification unit configured to notify a controller time based on the synchronized controller clock to at least one local device through periodic communication.

(Appendix 2) The controller according to appendix 1,
wherein the controller clock management unit is further configured to adjust the controller time based on an amount of time change corresponding to a time difference between the global clock and the controller clock.

(Appendix 3) The controller according to appendix 2,
wherein the controller clock management unit is further configured to correct the controller clock based on the amount of time change, as at least a part of the adjusting the controller time; and
wherein the notification unit is configured to notify the controller time based on the corrected controller clock to the at least one local device.

(Appendix 4) The controller according to appendix 3,
wherein the controller clock management unit is configured to correct the controller clock by an amount of correction obtained by dividing the amount of time change over a plurality of communication cycles of the periodic communication, in response to the amount of time change exceeding a given threshold.

(Appendix 5) The controller according to appendix 4,
wherein the controller clock management unit is further configured to set the amount of correction within a given correction upper limit, in each of the plurality of communication cycles.

(Appendix 6) The controller according to appendix 5,
wherein the controller clock management unit is further configured to:
repeat the correction of the controller clock until the amount of correction becomes less than or equal to the correction upper limit; and
synchronize the controller clock to the global clock in response to the amount of correction becoming less than or equal to the correction upper limit.

(Appendix 7) The controller according to any one of appendices 4 to 6, further comprising a flag management unit configured to set a flag indicating that the controller clock is under correction, in response to the amount of time change exceeding the threshold,
wherein the controller clock management unit is configured to correct the controller clock based on the amount of time change without referring to the global clock, in response to the flag being set.

(Appendix 8) The controller according to appendix 7,
wherein the flag management unit is further configured to clear the flag in response to the controller clock being synchronized with the global clock.

(Appendix 9) The controller according to any one of appendices 1 to 8,
wherein the notification unit is configured to notify the controller time to the at least one local device, in each communication cycle of the periodic communication.

(Appendix 10) The controller according to any one of appendices 1 to 9,
wherein the controller clock management unit is further configured to:
receive a global time based on the global clock from a time server through non-periodic communication; and
synchronize the controller clock with the global clock based on the global time.

(Appendix 11) The controller according to any one of appendices 1 to 10,
wherein the controller clock management unit comprises:
a first clock management unit configured to synchronize a master clock in the controller with the global clock to set a master time based on the master clock; and
a second clock management unit configured to synchronize the controller clock with the master clock to set the controller time.

(Appendix 12) The controller according to appendix 11,
wherein the first clock management unit is further configured to generate a master clock signal corresponding to the master time and having a master clock cycle, and
wherein the second clock management unit is further configured to:
generate an internal signal corresponding to the controller time and having a given internal cycle, based on the master clock cycle; and
synchronize the controller clock with the master clock based on a start time based on the master clock and at least one of the master clock cycle and the internal cycle.

(Appendix 13) The controller according to appendix 12,
wherein the second clock management unit is configured to generate the internal signal at the internal cycle shorter than the master clock cycle.

(Appendix 14) The controller according to any one of appendices 1 to 13,
wherein the controller clock management unit is configured to synchronize the controller clock with the global clock further based on an internal delay in the controller.

(Appendix 15) A device control system comprising:
the controller according to any one of appendices 1 to 14; and
the at least one local device,
wherein each of the at least one local device comprises a local clock management unit configured to synchronize a local clock in the local device with the controller clock based on the controller time notified by the notification unit.

(Appendix 16) The device control system according to appendix 15,
the local clock management unit is configured to synchronize the local clock with the controller clock further based on a time delay by the periodic communication.

(Appendix 17) The device control system according to appendix 15 or 16,
wherein at least one of the at least one local device is a robot controller.

(Appendix 18) A time synchronization method comprising:
synchronizing a controller clock in a controller with an external global clock; and notifying a controller time based on the synchronized controller clock to at least one local device through periodic communication.

(Appendix 19) A time synchronization program for causing a computer to execute:
synchronizing a controller clock in a controller with an external global clock; and
notifying a controller time based on the synchronized controller clock to at least one local device through periodic communication.

What is claimed is:

1. A controller comprising circuitry configured to:
receive global time data indicating a global time associated with an external global clock;
determine a time difference between the global clock and an internal controller clock of the controller based on the global time data;
compare an amount of time change corresponding to the time difference to a given threshold;
divide the amount of time change over a plurality of communication cycles of periodic communication to set an amount of correction, in response to determining that the amount of time change exceeds the given threshold;
correct the internal controller clock based on the amount of correction;
synchronize the corrected controller clock of the controller with the global clock based on the global time;
set a controller time based on the synchronized controller clock; and
transmit controller time data indicating the controller time to at least one robot through the periodic communication.

2. The controller according to claim 1, wherein the circuitry is further configured to set the amount of correction within a given correction upper limit, in each of the plurality of communication cycles.

3. The controller according to claim 2, wherein the circuitry is further configured to set the correction upper limit based on one communication cycle of the periodic communication.

4. The controller according to claim 2, wherein the circuitry is further configured to:
repeat the correction of the controller clock until the amount of correction becomes less than or equal to the correction upper limit; and
synchronize the controller clock to the global clock in response to determining that the amount of correction becomes less than or equal to the correction upper limit.

5. The controller according to claim 1, wherein the circuitry is further configured to:
set a flag indicating that the controller clock is under correction, in response to determining that the amount of time change exceeds the threshold; and
correct the controller clock based on the amount of time change without referring to the global clock, in response to setting the flag.

6. The controller according to claim 5, wherein the circuitry is further configured to clear the flag in response to determining that the controller clock is synchronized with the global clock.

7. The controller according to claim 1, wherein the controller time data is transmitted to the at least one robot, in each communication cycle of the periodic communication.

8. The controller according to claim 1, wherein the circuitry is further configured to receive the global time data from a time server through non-periodic communication.

9. The controller according to claim 1, wherein the circuitry is further configured to:
synchronize a master clock of the controller with the global clock to set a master time based on the master clock; and
synchronize the controller clock with the master clock to set the controller time.

10. The controller according to claim 9, wherein the circuitry is further configured to:
generate a master clock signal corresponding to the master time and having a master clock cycle;
generate an internal signal corresponding to the controller time and having a given internal cycle, based on the master clock cycle;
set a start time based on the master clock; and
synchronize the controller clock with the master clock based on the start time and at least one of the master clock cycle and the internal cycle.

11. The controller according to claim 10, wherein the circuitry is further configured to:
set the internal cycle shorter than the master clock cycle; and
generate the internal signal having the set internal cycle.

12. The controller according to claim 1, wherein the controller clock is synchronized with the global clock further based on an internal delay in the controller.

13. A device control system including the controller according to claim 1, and further comprising the at least one robot,
wherein each of the at least one robot is configured to synchronize a local clock of the robot with the controller clock based on the transmitted controller time data.

14. The device control system according to claim 13, wherein the local clock is synchronized with the controller clock further based on a time delay of the periodic communication.

15. A controller comprising circuitry configured to:
receive global time data indicating a global time associated with an external global clock;
determine a time difference between the global clock and an internal controller clock of the controller based on the global time data;
compare an amount of time change corresponding to the time difference to a given threshold;
divide the amount of time change over a plurality of communication cycles of periodic communication to set an amount of correction, in response to determining that the amount of time change exceeds the given threshold;
correct the controller clock based on the amount of correction;
synchronize the corrected controller clock with the global clock; and
transmit controller time data indicating a controller time based on the synchronized controller clock to at least one local device through the periodic communication.

16. The controller according to claim 15, wherein the circuitry is further configured to set the amount of correction within a given correction upper limit, in each of the plurality of communication cycles.

17. The controller according to claim 16, wherein the circuitry is further configured to set the correction upper limit based on one communication cycle of the periodic communication.

18. A method of synchronization comprising:
- receiving global time data indicating a global time associated with an external global clock;
- determining a time difference between the global clock and an internal controller clock of a controller based on the global time data;
- comparing an amount of time change corresponding to the time difference to a given threshold;
- dividing the amount of time change over a plurality of communication cycles of periodic communication to set an amount of correction, in response to determining that the amount of time change exceeds the given threshold;
- correcting the controller clock based on the amount of correction;
- synchronizing the corrected controller clock of the controller with the global clock based on the global time;
- setting a controller time based on the synchronized controller clock; and
- transmitting controller time data indicating the controller time to at least one local device through the periodic communication.

19. The method according to claim 18, further comprising setting the amount of correction within a given correction upper limit, in each of the plurality of communication cycles.

20. The method according to claim 19, further comprising setting the correction upper limit based on one communication cycle of the periodic communication.

* * * * *